United States Patent
Bircher

(10) Patent No.: US 8,459,861 B2
(45) Date of Patent: Jun. 11, 2013

(54) METHOD AND APPARATUS FOR USE OF MIXING ELEMENTS IN WASTEWATER / RECYCLE WATER UV DISINFECTION SYSTEM

(75) Inventor: Keith G. Bircher, Toronto (CA)

(73) Assignee: Calgon Carbon Corporation, Pittsburgh, PA (US)

(*) Notice: Subject to any disclaimer, the term of this patent is extended or adjusted under 35 U.S.C. 154(b) by 753 days.

(21) Appl. No.: 12/625,625

(22) Filed: Nov. 25, 2009

(65) Prior Publication Data

US 2010/0166601 A1   Jul. 1, 2010

Related U.S. Application Data

(60) Provisional application No. 61/200,292, filed on Nov. 16, 2008.

(51) Int. Cl.
| B01F 5/00 | (2006.01) |
| B01F 15/00 | (2006.01) |
| A61L 2/00 | (2006.01) |
| G01N 23/12 | (2006.01) |

(52) U.S. Cl.
USPC .................. 366/158.5; 366/173.1; 366/174.1; 422/24; 422/186.3; 250/435; 250/436; 250/437

(58) Field of Classification Search
None
See application file for complete search history.

(56) References Cited

U.S. PATENT DOCUMENTS

| 1,151,267 A | 8/1915 | Henri et al. |
| 3,924,139 A | 12/1975 | Hirose et al. |
| 3,971,947 A | 7/1976 | Lambert et al. |
| 4,482,809 A | 11/1984 | Maarschalkerweerd |
| 4,872,980 A | 10/1989 | Maarschalkerweerd |
| 5,006,244 A | 4/1991 | Maarschalkerweerd |
| 5,423,608 A * | 6/1995 | Chyou et al. .................. 366/337 |
| 5,503,800 A | 4/1996 | Free |
| 5,590,390 A | 12/1996 | Maarschalkerweerd |
| 5,624,573 A | 4/1997 | Wiesmann |
| 5,780,860 A | 7/1998 | Gadgil et al. |
| 5,846,437 A | 12/1998 | Whitby et al. |
| 5,952,663 A | 9/1999 | Blatchley, III et al. |
| 6,015,229 A | 1/2000 | Cormack et al. |
| RE36,896 E | 10/2000 | Maarschalkerweerd |
| 6,126,841 A | 10/2000 | Whitby et al. |
| 6,420,715 B1 | 7/2002 | Cormack et al. |
| 7,018,544 B2 | 3/2006 | Veenstra et al. |
| 7,097,764 B2 | 8/2006 | Neofotistos |
| 7,159,264 B2 | 1/2007 | Sotirakos et al. |
| 7,166,850 B2 | 1/2007 | Brunet et al. |
| 2002/0036951 A1 | 3/2002 | Brunet et al. |
| 2005/0092932 A1 | 5/2005 | Bircher et al. |
| 2008/0121812 A1 | 5/2008 | Bircher |

FOREIGN PATENT DOCUMENTS

| CA | 2668964 A1 | 5/2008 |
| CA | 2414072 C | 11/2009 |
| DE | 2213658 | 8/1974 |

(Continued)

*Primary Examiner* — Neil N Turk
(74) *Attorney, Agent, or Firm* — Pepper Hamilton LLP

(57) ABSTRACT

An apparatus and method for mixing at least one fluid flowing through a fluid system using ultraviolet light to control organisms. Ultraviolet lamps are positioned in the fluid flow and arrays of triangularly shaped mixing elements are arranged at spaced intervals along the length of each lamp, wherein the plurality of arrays of triangularly shaped mixing elements create four vortices surrounding each elongated member forming a square array of vortices.

18 Claims, 20 Drawing Sheets

FOREIGN PATENT DOCUMENTS

| | | |
|---|---|---|
| DE | 3740005 A1 | 6/1989 |
| DE | 4417139 C2 | 4/1996 |
| EP | 317735 A2 | 5/1989 |
| EP | 0893411 B1 | 4/2004 |
| JP | 9276859 | 10/1997 |
| WO | WO9708099 A1 | 3/1997 |
| WO | WO9829345 A2 | 7/1998 |
| WO | WO0193995 A2 | 12/2001 |
| WO | WO02072480 | 9/2002 |
| WO | WO2004048274 A1 | 6/2004 |

* cited by examiner

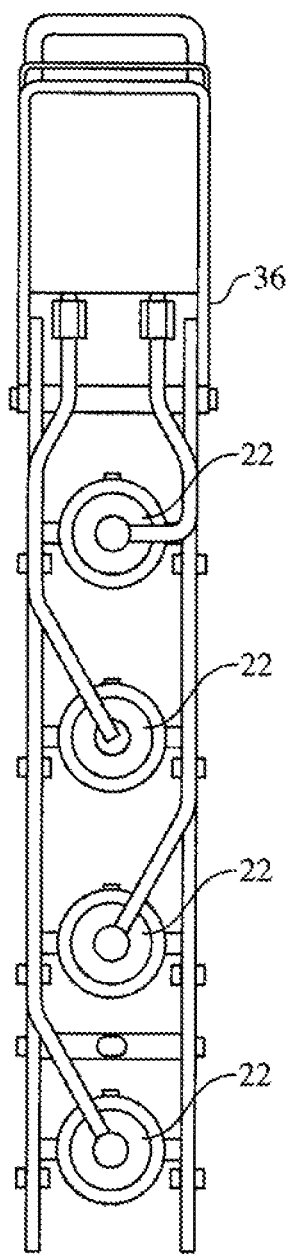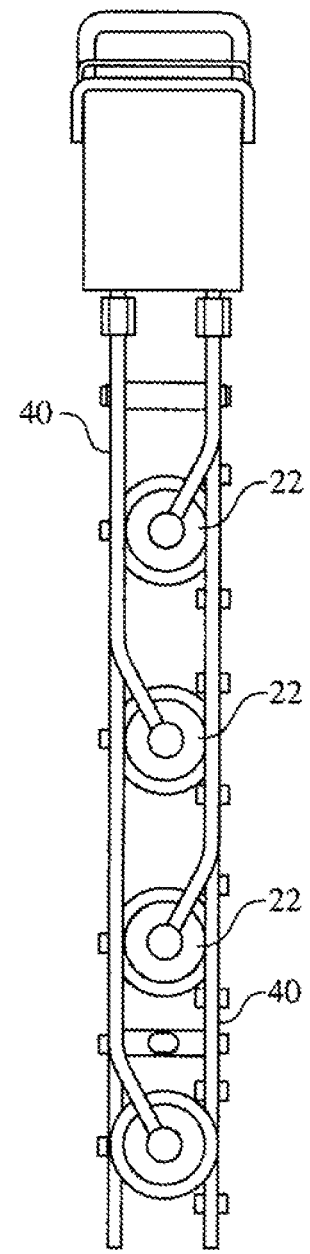
FIG. 14
FIG. 15
(PRIOR ART)

FIG. 19a A-A VIEW

FIG. 19b B-B VIEW

METHOD AND APPARATUS FOR USE OF MIXING ELEMENTS IN WASTEWATER / RECYCLE WATER UV DISINFECTION SYSTEM

CROSS-REFERENCE TO RELATED APPLICATION

This application claims the benefit under 35 U.S.C. §119 (e) of the earlier filing date of U.S. Provisional Application Ser. No. 61/200,292 filed on Nov. 16, 2008, the contents of which are hereby incorporated by reference.

FIELD OF INVENTION

This invention relates generally to systems that use ultraviolet (UV) light to control organisms, and in particular to the mixing of fluids in systems using UV light for the disinfection of fluids.

BACKGROUND OF THE INVENTION

Wastewater treatment plants often use lamp racks oriented horizontally in the direction of flow in an open channel. The lamps emit ultraviolet light (UV) that inactivates pathogenic microorganisms rendering the water safe for discharge to a receiving water body or for re-use of the water (irrigation, indirect potable re-use, industrial use, gray water for non-potable use, etc.) The racks hold lamps in an array dispersed over the cross section of the channel such that none of the water flowing down the channel passes too far from any one lamp. Known open channel fluid treatment devices are shown, by example, in U.S. Pat. Nos. 4,482,809; and 5,006,244 the disclosures of which are incorporated by reference herein.

There is a practical limit on how far water can pass from a lamp and still receive adequate disinfection. FIG. 1 is a chart showing the drop off in UV irradiance with distance from the lamp in water with UV transmittance of 55% T and 65% T.

Typically UV systems using low pressure mercury arc lamps have a lamp spacing of approximately 7.5 cm in a square array. With 2.5 cm diameter quartz tubes this means that the maximum distance from any lamp is approximately 4 cm. This provides sufficient space for the water to pass between the lamps without undue head loss and is close enough to achieve adequate penetration of the UV to all areas and hence adequate disinfection. These low pressure systems have lamps with a total power consumption of under 100 Watts and a UVC (germicidal UV) output of under 50 Watts.

More recent advancement in lamp technology has produced low pressure lamps with higher output. Higher lamp output means that more water can be disinfected per lamp, and hence the flow of water must be increased proportional to the lamp UVC output. However due to head loss limits across a bank of lamps (too high a head loss means that the level of water upstream of the bank must increase and some of the water will spill over the top of the lamp bank and not be adequately treated), the lamp spacing must be increased to accommodate the greater water flow. For example lamps with an electrical consumption of 250 Watts and UVC output of approximately 100 Watts, must be accommodated in arrays with 10 cm lamp spacing. The additional area for the flow of water limits the velocity and hence head loss across the lamp bank. This results in a reduction in the UV irradiance at the point furthest from all the lamps as shown in FIG. 2.

This reduced irradiance at the furthest point from the lamps results in some decrease in the performance efficiency associated with this greater lamp spacing, especially at lower UV Transmittances (55% T), but the advantages of being able to use fewer lamps overcomes the increase in electrical consumption that results.

More recent development of even higher powered lamps (500 Watt, with 200 W UVC output) would potentially result in the number of lamps needed being reduced to half that of systems employing 250 W lamps. However this means that the flow per lamp must be doubled, resulting in a quadrupling in the head loss across a lamp bank (head loss is proportional velocity squared) unless the spacing of the lamps is increased even more. However increasing the spacing beyond 10 cm results in a further reduction in treatment efficiency, negating the potential advantages of fewer higher power lamps.

One means of overcoming this is to close off the top of the lamp bank such that water cannot spill over the top of the bank and is forced to flow at the higher velocity and consequent pressure loss past the lamps with the smaller 4 inch or lower lamp spacing. This has been successfully employed where much higher powered medium pressure (MP) lamps are used (2500 Watt/lamp, 370'Wall UVC) (U.S. Pat. No. 5,590,390, the disclosure of which is incorporated by reference herein) and in a system that employed triangularly shaped or delta wing mixing elements with even greater spacing and 5,000 Watt lamps (750 Watt UVC) (U.S. Pat. No. 6,015,229, the disclosure of which is incorporated by reference herein). Even though the system disclosed in U.S. Pat. No. 6,015,229 had the closed top, the lamp spacing still had to be increased to reduce overall velocity and head loss. In the system disclosed in U.S. Pat. No. 6,015,229, the 5,000 Watt MP lamps are relatively short (60 cm long). One drawback of the system disclosed in U.S. Pat. No. 6,015,229 is that if longer lamps are used, the vortices generated by the delta wings die off and the effectiveness is diminished. The system disclosed in U.S. Pat. No. 6,015,229 therefore is best used with relatively short MP lamps (60 cm long vs. typical 1.8 m long for LP lamps).

With one delta wing array placed at the beginning of a LP lamp bank the vortices essentially die out after approximately 40 cm. This has been modeled using Computational Fluid Dynamic Modeling (CFD) and is shown in FIGS. 3 and 4. FIG. 3 is a velocity vortex diagram showing vortices 2 cm downstream of delta wings. FIG. 4 is a velocity vortex diagram showing vortices 40 cm downstream of delta wings.

The rotational velocity and therefore ability of the vortices to mix in the water furthest from the lamps is represented by the velocity vectors in FIGS. 3 and 4, with longer arrows and therefore higher rotational speeds immediately after the lamp (FIG. 3) and smaller arrows and hence lower rotational speed 40 cm downstream of the deltas.

SUMMARY OF THE INVENTION

Embodiments of the invention include an apparatus and method for mixing at least one fluid flowing through a fluid system, comprising an array of rows and columns of elongated members wherein each elongated member is horizontally aligned with elongated members in adjacent columns and vertically aligned with elongated members in adjacent rows of elongated member, and wherein the axis of each elongated member is aligned with the direction of fluid flow; and a plurality of arrays of mixing elements arranged at spaced intervals along the length of each elongated member, wherein the plurality of arrays of mixing elements create four vortices surrounding each elongated member forming a square array of vortices. Embodiments of the invention include wherein each elongated member is an ultraviolet light source and wherein the mixing elements include mixing elements having a triangular shape with one apex pointing upstream and at an angle to the direction of flow.

BRIEF DESCRIPTION OF THE DRAWINGS

Referring now to the drawings, wherein like numerals designate identical or corresponding parts throughout the referred views.

FIG. 14 is a cross-section view of lamp rack showing wide frame directing more of the water flow past the quartz tubes according to an embodiment of the invention.

FIG. 15 is a cross-section of lamp rack showing narrow frame directing the water flow away from the quartz tubes according to the prior art.

DETAILED DESCRIPTION OF THE INVENTION

Figure 5A:
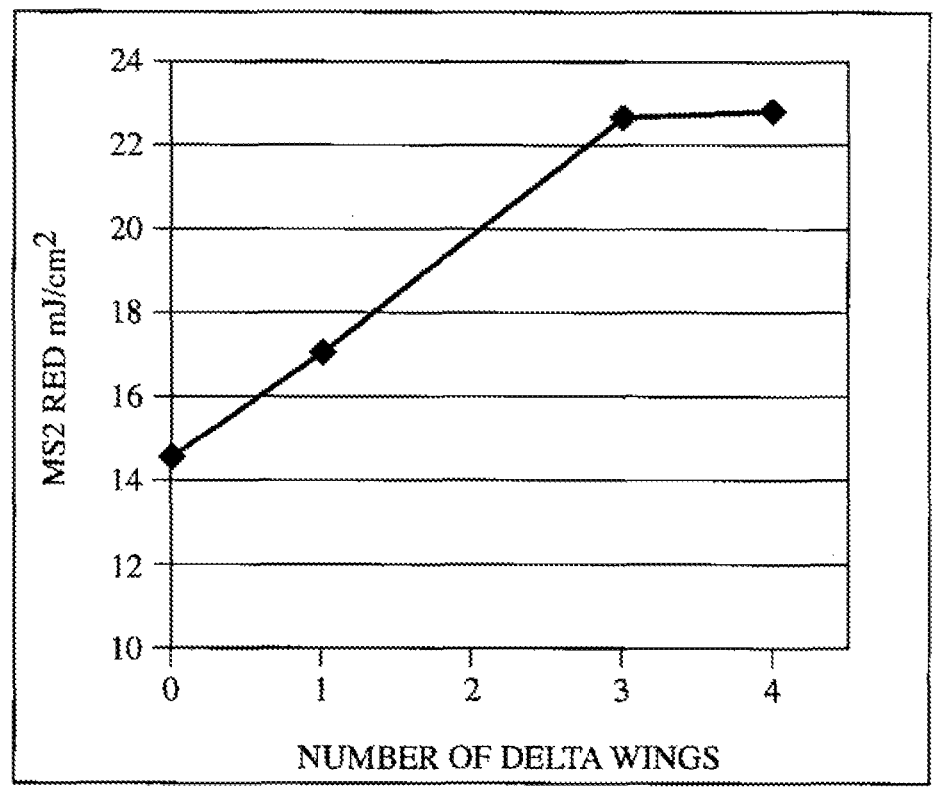
FIG. 5a is a graph of the effect of zero, one, three and four deltas arrays equally spaced down the length of the lamp on microbe inactivation performance.

Embodiments of the invention employ more than one delta wing (triangularly shaped mixing element) array at spaced intervals along the length of a UV lamp in a system using UV light for the disinfection of fluids. Arrangements of triangularly shaped mixing element arrays were tested using computational fluid dynamic modeling combined with an irradiance field model to simulate the microbe inactivation. In FIG. 5a the effect of zero, one, three and four triangularly shaped mixing element arrays equally spaced along the length of the lamp on microbe inactivation performance is shown. It can be seen that an arrangement of three triangularly shaped mixing elements spaced along a lamp has an improved performance over an arrangement having only one array of triangularly shaped mixing elements.

This arrangement of three triangularly shaped mixing element arrays spaced along the length of the UV lamps was tested with a pilot system at a waste water treatment plant using surrogate microorganisms MS2 phage and T1 phage (known surrogate organisms used in bioassay testing) with and without the triangularly shaped mixing elements. The lamp spacing on the pilot system was 6 inches (15 cm).

Figure 5B:
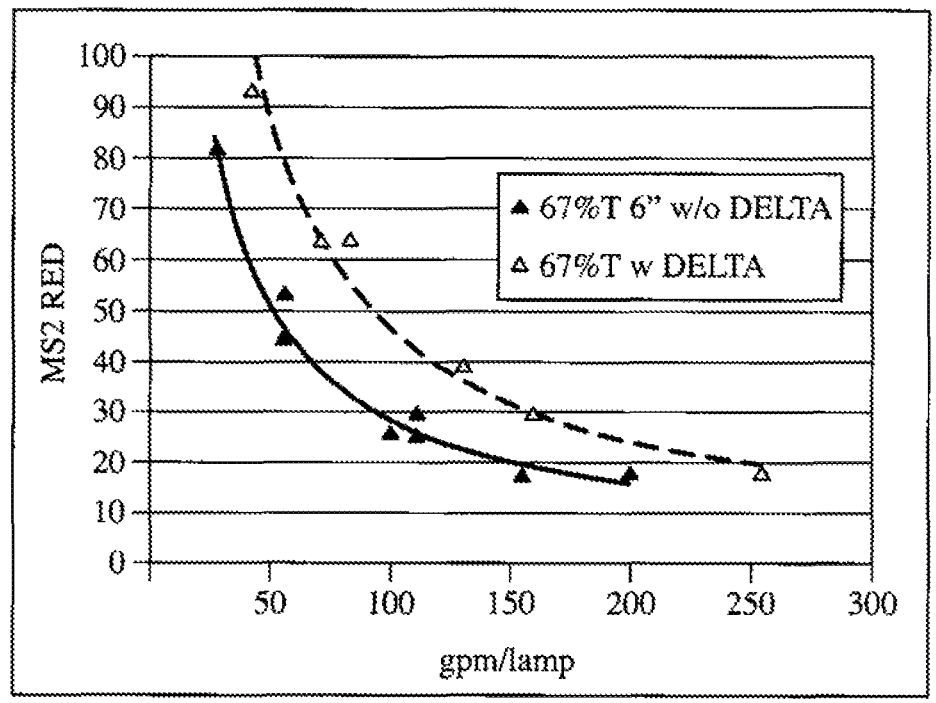
FIG. 5b is Pilot bioassay test data of the MS2 Reduction Equivalent Dose ("RED") with delta wings (dashed line) and without at 67% T vs. the flow rate per lamp according to an embodiment of the invention.
Figure 6:
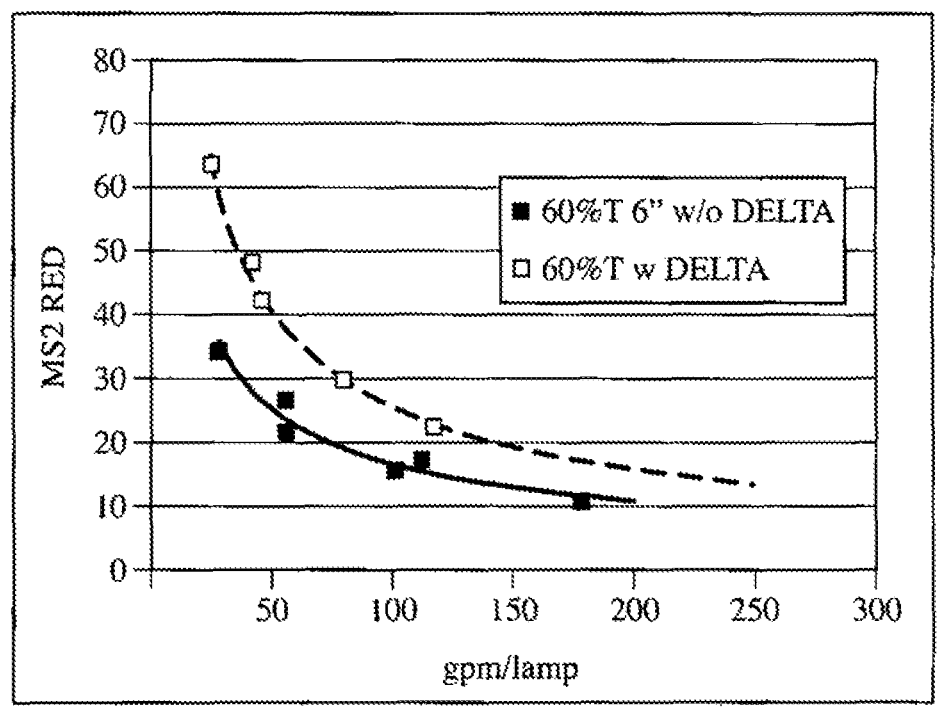
FIG. 6 is Pilot bioassay test data of the MS2 RED with delta wings (dashed line) and without at 60% T according to an embodiment of the invention.
Figure 7:
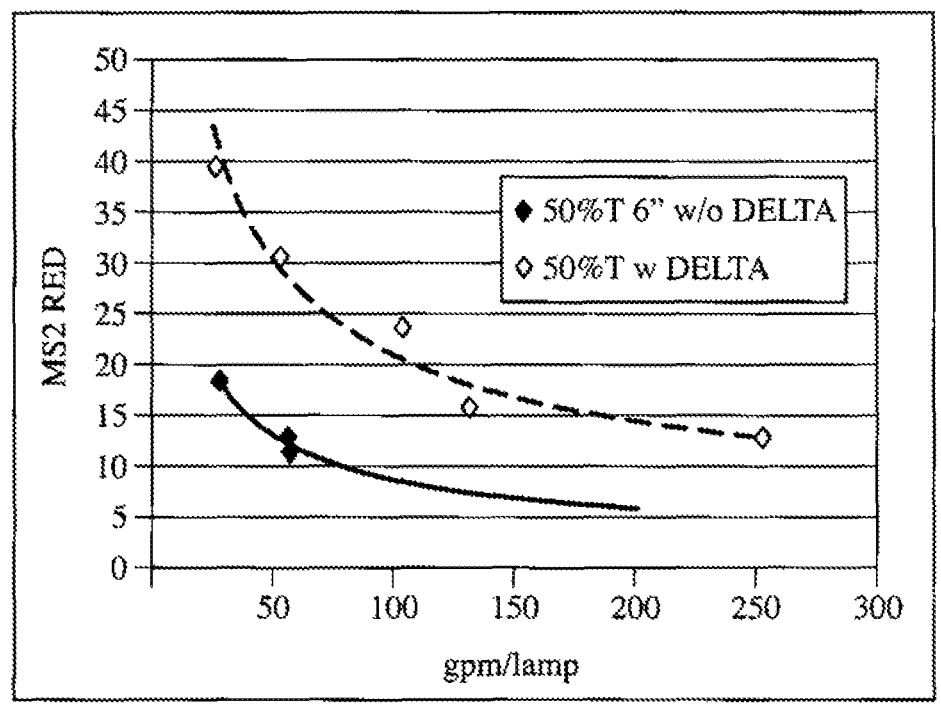
FIG. 7 is Pilot bioassay test data of the MS2 RED with delta wings (dashed line) and without at 50% T according to an embodiment of the invention.

In addition to testing, the raw water at approximately 67% UV transmittance, the transmittance was adjusted to 60% T and 50% T using humic acid to simulate natural low transmittance waters. FIGS. 5b, 6 and 7 show the improvement in performance that is achieved with and without the three triangularly shaped mixing element array.

Figure 1:
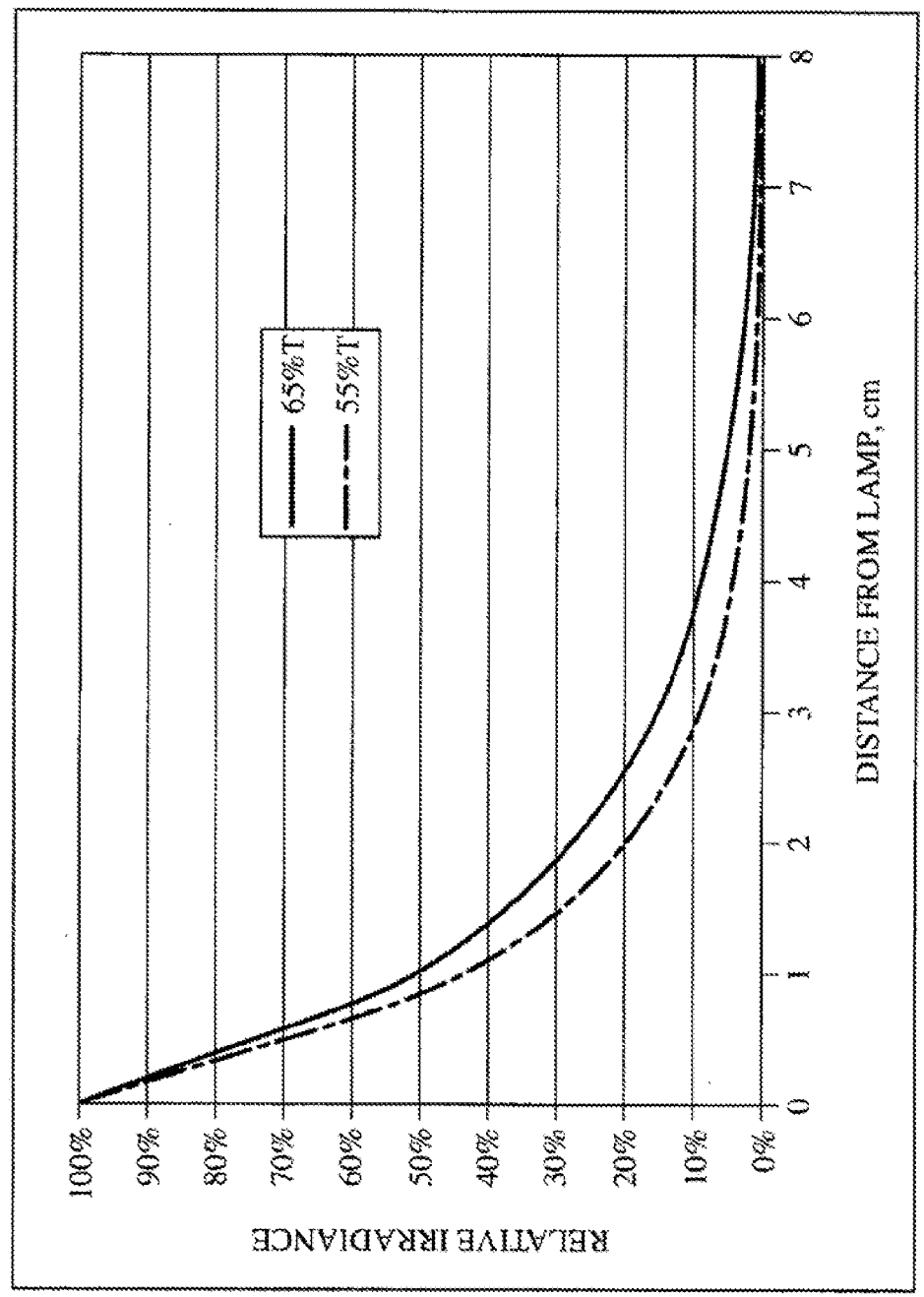
FIG. 1 is graph showing relative UV irradiance with distance from a lamp/quartz combination shown at water transmittance of 55 (dashed line) and 65% per cm.
Figure 2:
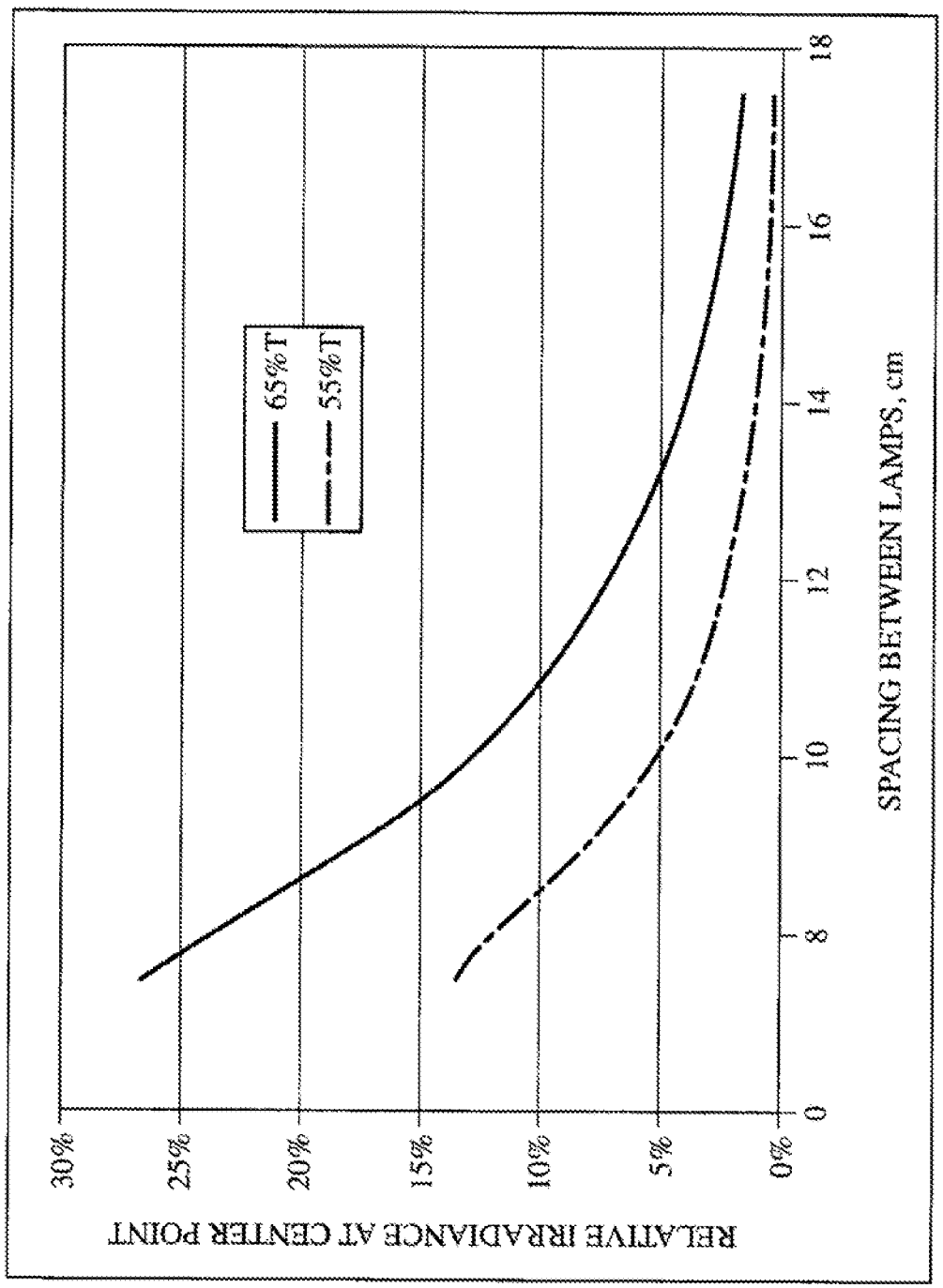
FIG. 2 is graph show relative irradiance at the center point between 4 lamps in a square lamp array vs. lamp spacing between adjacent lamps in the array.
Figure 3:
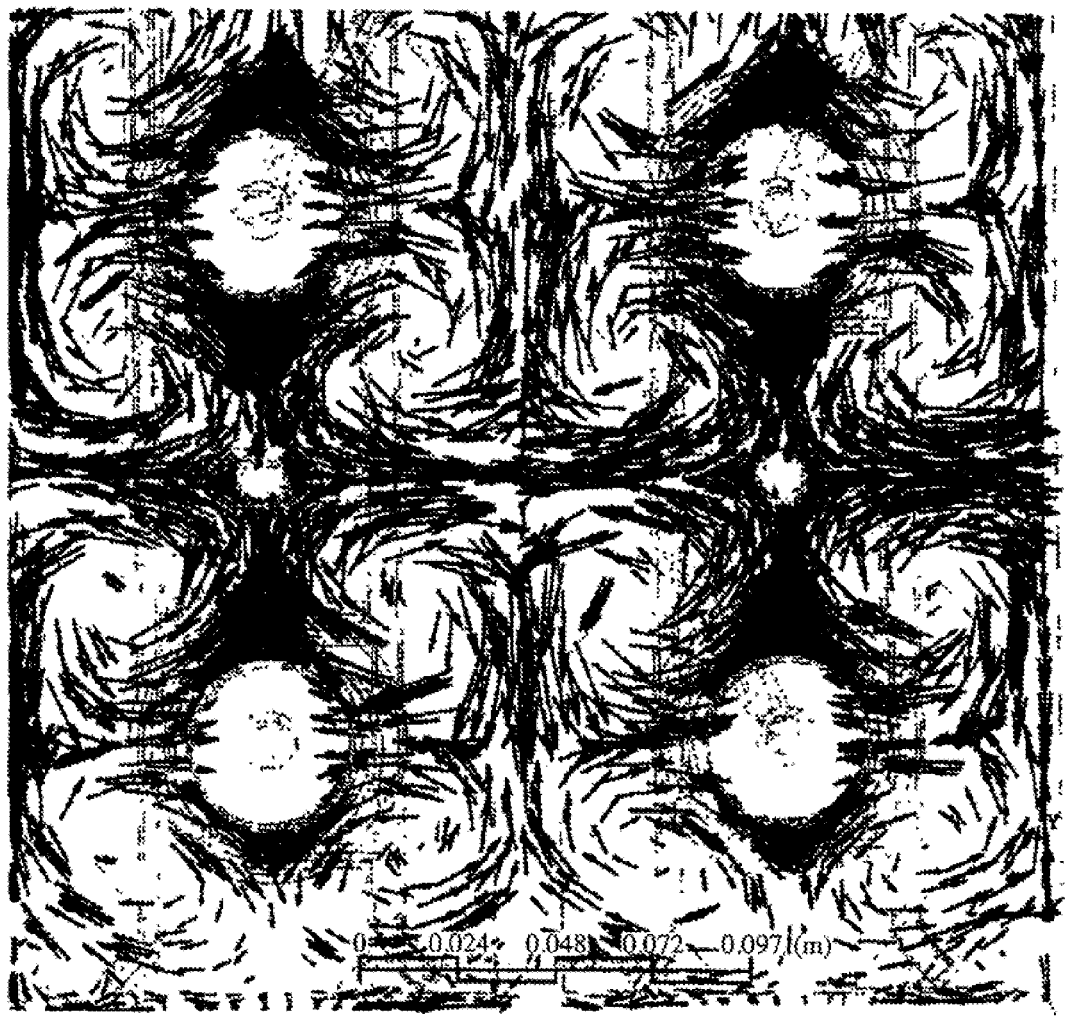
FIG. 3 is a velocity vortex diagram showing vortices 2 cm downstream of delta wings.
Figure 4:
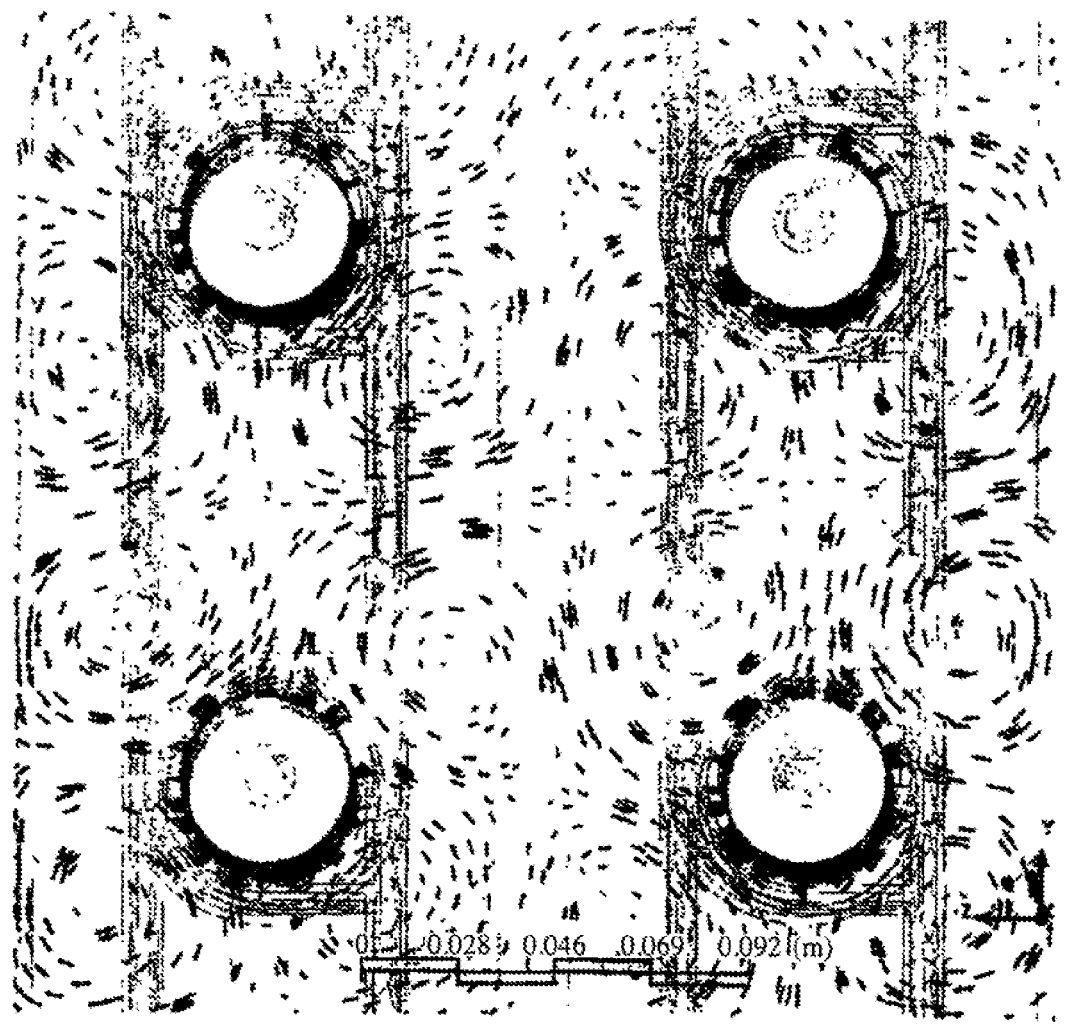
FIG. 4 is a velocity vortex diagram showing vortices 40 cm downstream of delta wings.
Figure 8:
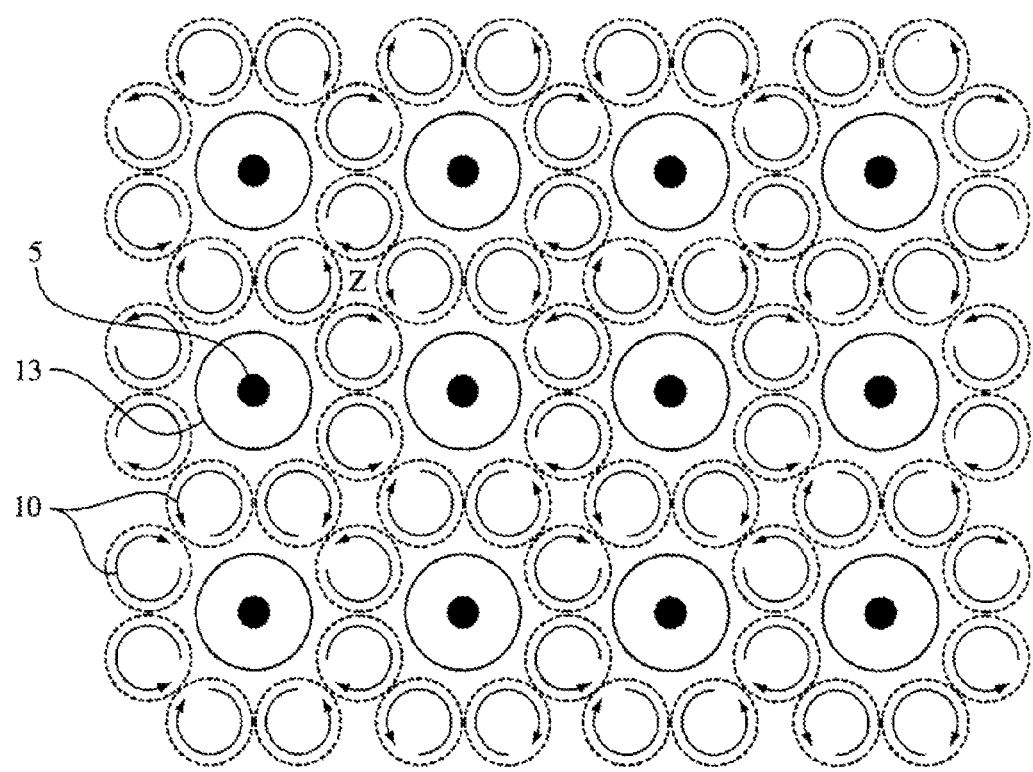
FIG. 8 shows prior art embodiments of the use of delta wings have employed a delta wing array that generates 8 vortices around each lamp. This figure is taken from FIG. 4 of U.S. Pat. No. 6,015,229.

Previous embodiments of the use of triangularly shaped mixing elements have employed a triangularly shaped mixing element array that generates eight vortices around each lamp. This is shown in FIG. 4 of U.S. Pat. No. 6,015,229 reproduced herein as FIG. 8 wherein UV lamps 5 are surrounded by a tube 13 and each triangularly shaped mixing element produces a pair of counter-rotating vortices 10.

The idea as proposed in U.S. Pat. No. 6,015,229 was to take highly treated water in close proximity to the lamp and move it away from the lamp and to take untreated or marginally treated water far from the lamp and move it in close proximity to the lamp.

Figure 9:
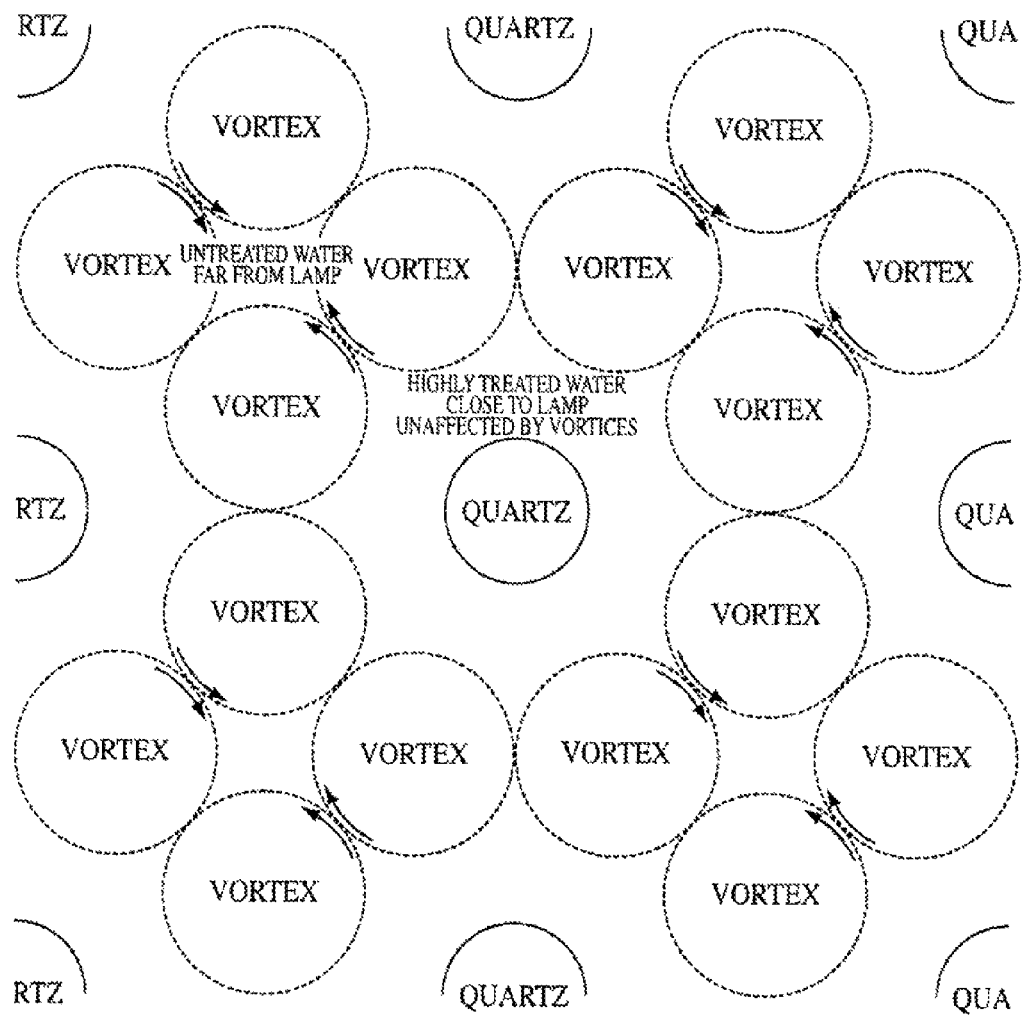
FIG. 9 shows a vortex pattern proposed in U.S. Pat. No. 6,015,229 with smaller quartz diameter to lamp spacing ratio showing region of highly treated water close to the lamp not swept away by the vortices.

This arrangement is not suited to a system where the ratio of the quartz diameter to the lamp spacing is lower than in the system proposed in U.S. Pat. No. 6,015,229 since the vortices do not sweep a large part of the highly treated water that is close to the lamp as illustrated in FIG. 9. Specifically, FIG. 9 illustrates what would happen if the arrangement disclosed in U.S. Pat. No. 6,015,229 were used with a smaller quartz diameter to lamp spacing ration. As illustrated, the vortex pattern shows regions of highly treated water close to the lamp that is unaffected or not swept away by the vortices.

Figure 10:
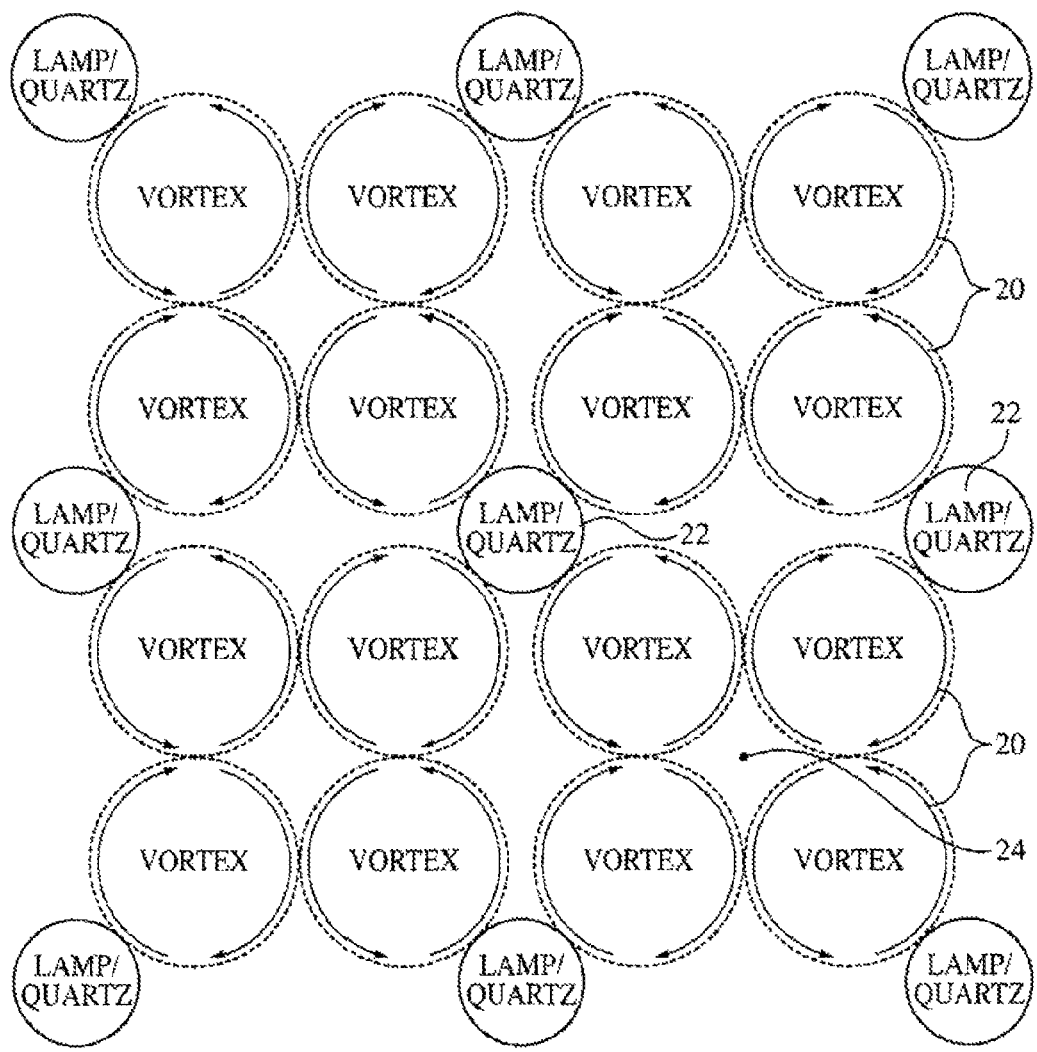
FIG. 10 is vortex pattern with four vortices around each lamp showing improved sweep of water close to lamp according to an embodiment of the invention.

The arrangement of embodiments of the invention is better suited to a system where the ratio of the quartz diameter to the lamp spacing is lower than in the system proposed in U.S. Pat. No. 6,015,229. In embodiments of the invention, four larger vortices 20 surround each lamp 22 as is shown in FIG. 10 forming a square array of vortices. As can be seen, the vortices are disposed approximate the lamp 22 taking that highly treated water and moving it away from the lamp 22, and conversely take the water far from the lamp (at the centerpoint 24 between four lamps 22) and move it in closer to the lamp 22.

Figure 11:
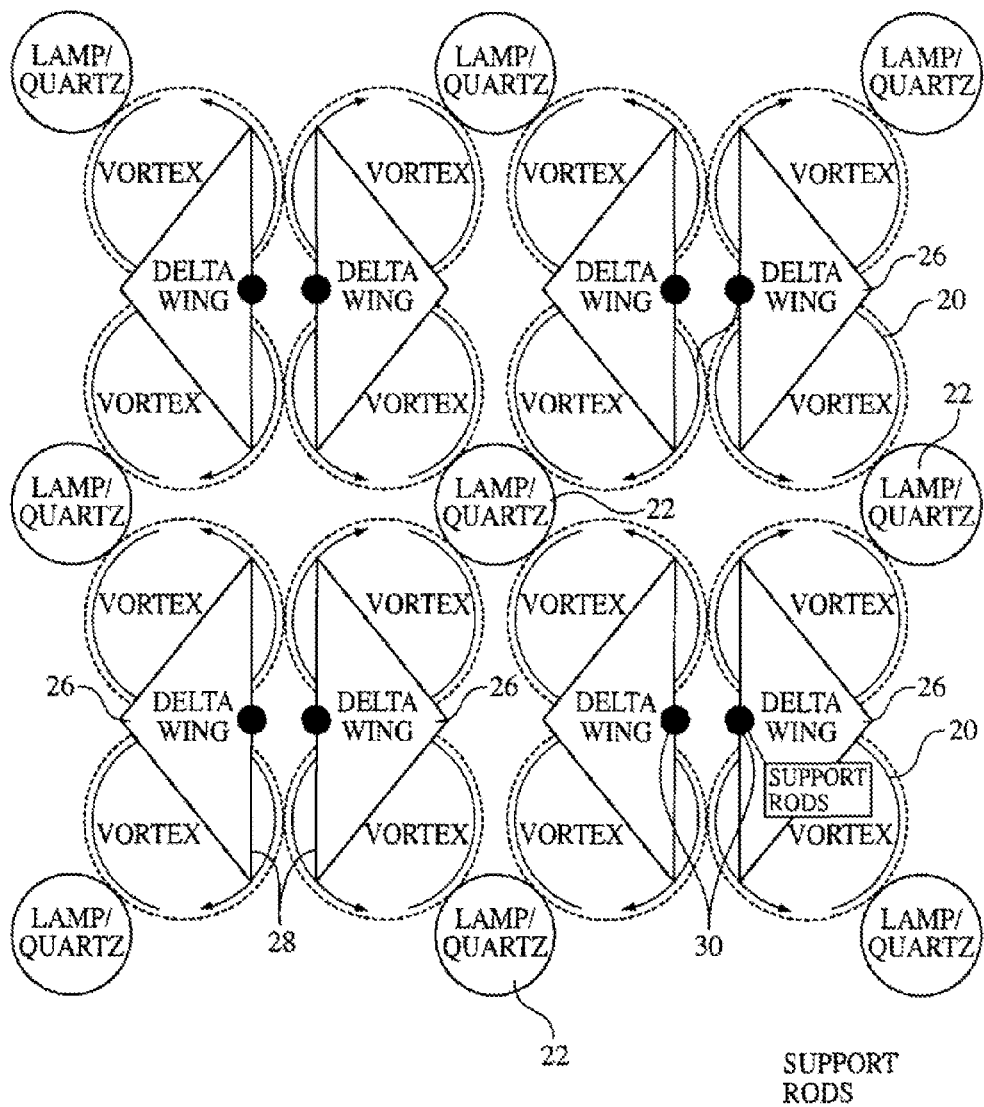
FIG. 11 shows triangularly shaped mixing elements that produce the vortex pattern shown in FIG. 10.

An arrangement of the invention having delta wings or triangularly shaped mixing elements 26 that produce a vortex pattern having four vortices 20 disposed approximate the lamp is shown in FIG. 11. Each triangularly shaped mixing element 26 is arranged with one apex pointing upstream and at an angle to the direction of flow. As illustrated in FIG. 11, pairs of triangularly shaped mixing elements 26 are arranged back-to-back such that the longest side 28 of each triangularly shaped mixing element 26 is arranged parallel and adjacent to the longest side (trailing edge) 28 of the other triangularly shaped mixing element 26 in the pair.

Each triangularly shaped mixing element 26 produces a pair of counter-rotating vortices 20 and the back-to-back triangularly shaped mixing elements 26, produce four counter-rotating vortices 20 that essentially rotate all the water in the space between four lamps 22 surrounding each pair. This counter-rotation is important in that the vortices 20 reinforce each other for higher rotational speed and longer sustainability. This arrangement of triangularly shaped mixing elements 26 is also preferred from a mechanical standpoint in that the triangularly shaped mixing elements 26 can be attached to their respective lamp rack and the whole lamp rack assembly can be withdrawn without affecting adjacent lamp racks. This is important for routine maintenance of in-channel UV disinfection systems. The support rods 30 that hold the triangularly shaped mixing elements 26 in place are also shown in FIG. 11. As can be seen here these rods 30 are placed so as to be outside of the sweep of the two counter-rotating vortices 20 produced by each triangularly shaped mixing element 26, but still in a good position to be able to secure the trailing edge of the triangularly shaped mixing element 26.

Figure 12:
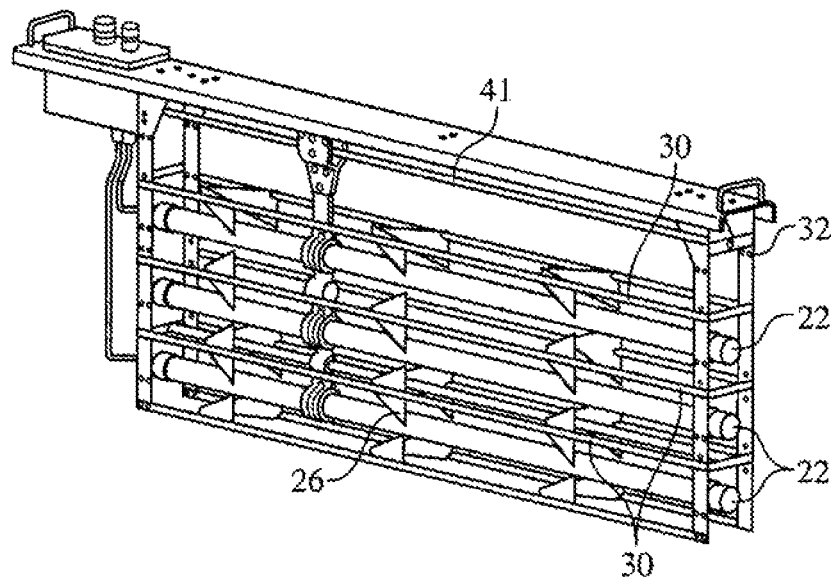
FIG. 12 is a drawing of lamp rack with triangularly shaped mixing elements according to an embodiment of the invention.

An assembled lamp rack 32, with three lamps 22 per rack 32, in the preferred embodiment of this system is shown in FIG. 12. An additional support 34 is placed further up towards the tip (leading angle) 35 of each triangularly shaped mixing element 26. This second support 34 is used to correctly align the angle of the triangularly shaped mixing elements 26 to the direction of flow (angle of attack) and further secure the triangularly shaped mixing elements 26 in place. It is also positioned at the centerline of the triangularly shaped mixing elements 26 so as not to interfere with the rotational sweep of the vortices 20.

Figure 13:
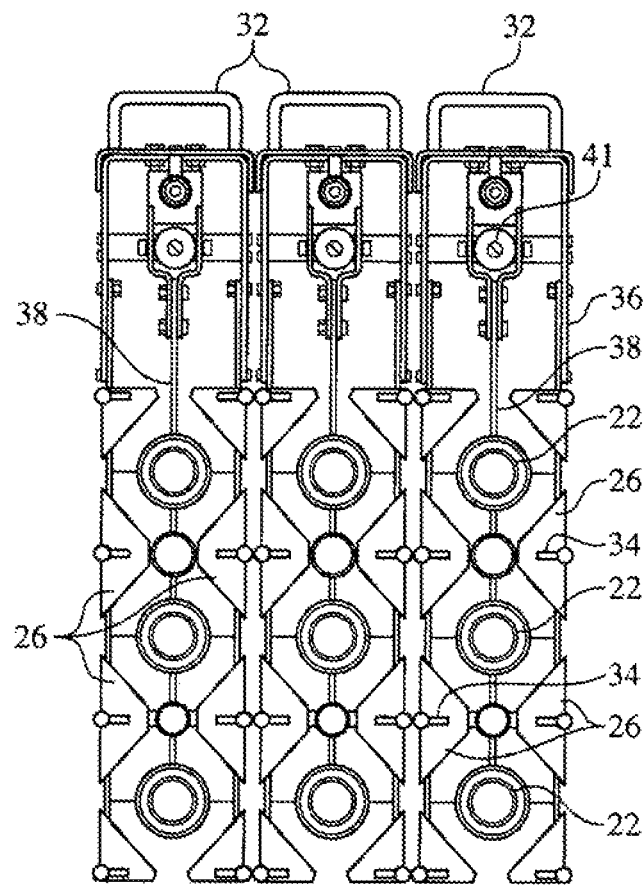
FIG. 13 is a cross-sectional with three lamp racks together showing frame, wiper drive arm, quartz tubes and triangularly shaped mixing elements according to an embodiment of the invention.

In an embodiment of the invention, the lamp rack arrangement 32 is provided with four, six or eight vertical lamps 22 per rack 32. However, any number of lamps 22 can be included in a single rack 32. Several racks 32 are arranged adjacent to each other to form a lamp array for use in an open channel UV disinfection system. FIG. 13 illustrates a cross-sectional view of three lamp racks 32 together showing the frame 36, wiper drive arms 38, quartz tubes containing lamps 22 and triangularly shaped mixing elements 26. The lamps 22 in this and other disclosed embodiments are arranged in a square array such that each lamp 22 is horizontally aligned with lamps 22 in adjacent columns of lamps and vertically aligned with lamps 22 in adjacent rows of lamps.

Most open channel rack mounted UV systems have vertical support members 40 at each end of the lamp rack to hold the quartz tubes and lamps 22. This vertical support in prior art systems is disposed in close proximity to the lamp as shown in the cross-sectional view of FIG. 15. This tends to force the water away from the lamps into the area between the lamps and results in lower performance of the UV system.

An improvement over this in an embodiment of the invention has a wide frame 36 that impedes water in the vertical plane furthest away from the lamps 22 and directs more water in the vertical plane of the lamps 22 as shown in FIG. 14. FIG. 14 also illustrates the point where open area is around the lamps 22 and impediments to flow (frame legs) are kept away from the lamps 22.

Figure 16A:
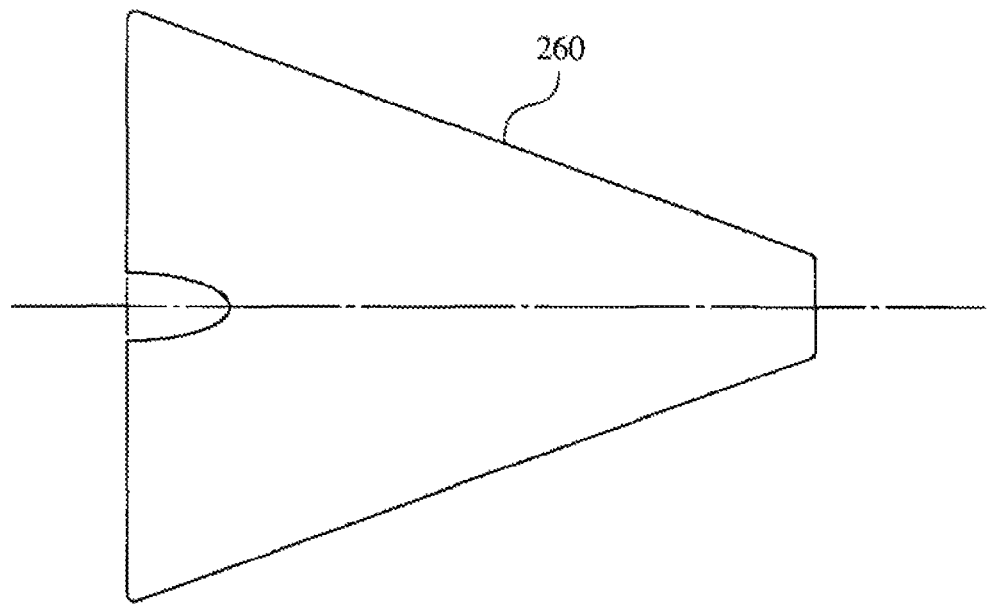
FIG. 16a shows a triangularly shaped mixing element with the tip removed according to an embodiment of the invention.
Figure 16B:
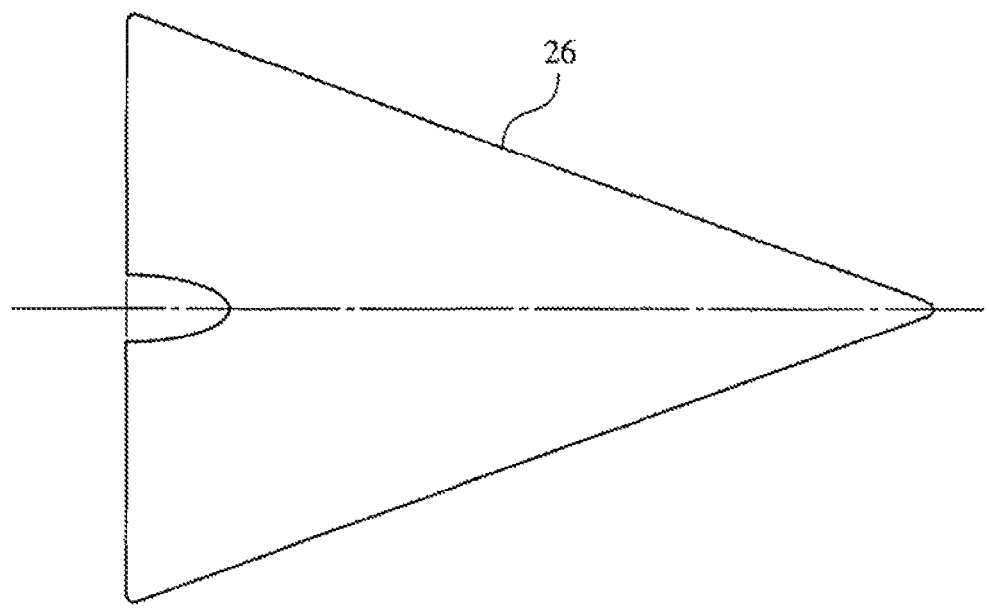
FIG. 16b shows a triangularly shaped mixing element without the tip removed.

A UV sensor (not shown) for measuring the UV irradiance in the water is placed between two quartz tubes in a lamp rack. It is desirable to clean this sensor as well as the quartz tubes with a scraper or wiper element that periodically travels down the length of the lamp. This wiper assembly can be driven by a vertical wiper drive arm 38 tied to a motor driven screw drive 41. An example of a scraper is disclosed in U.S. Pat. No. 7,159,264, the disclosure of which is incorporated by reference herein. An embodiment of the invention has a modified triangularly shaped mixing element 260 having the tip removed. This modified triangularly shaped mixing element 260 provides sufficient clearance between the sensor wiper and the triangularly shaped mixing element 260. The tip of the triangularly shaped mixing element 260 could interfere with the motion of the UV sensor wiper. The triangularly shaped mixing element with 260 and without 26 the tip removed is shown in FIGS. 16a and 16b. The clearance necessary for the wiper drive arm 38 is illustrated in FIG. 13.

CFD and irradiance intensity field computer modeling has been performed to show that the removal of this tip has very little effect on the microbial inactivation through the reactor.

Figure 17:
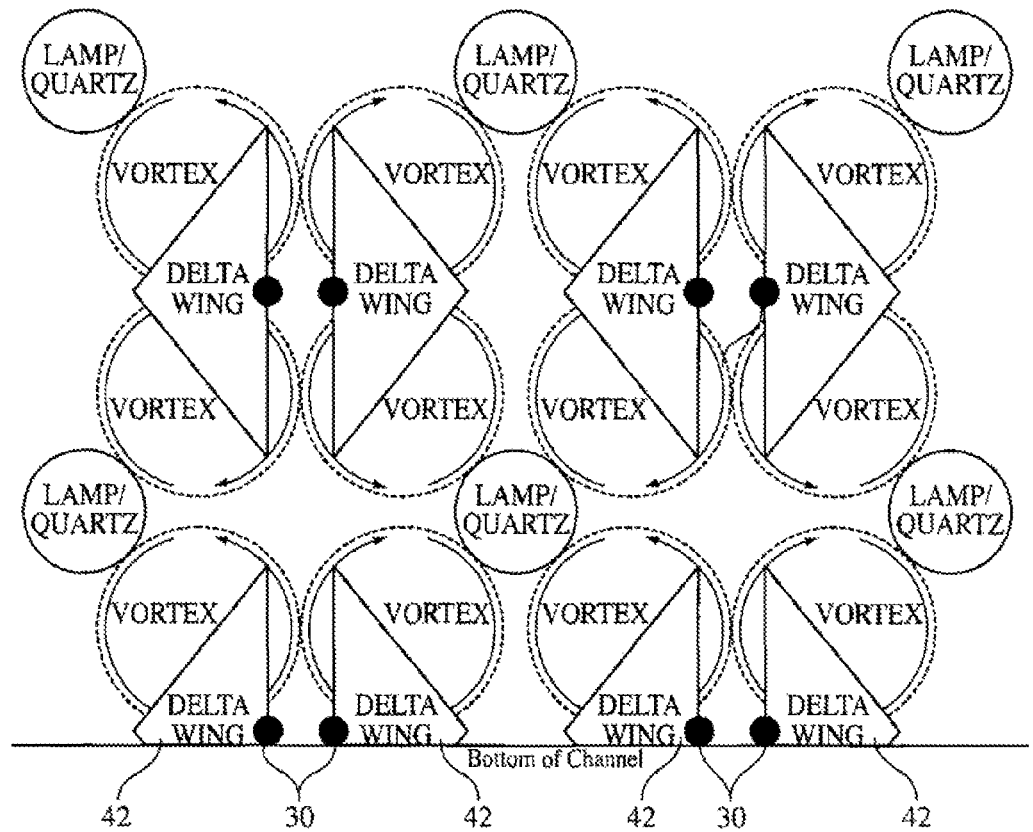
FIG. 17 shows half triangularly shaped mixing elements at bottom of channel according to an embodiment of the invention.
Figure 18:
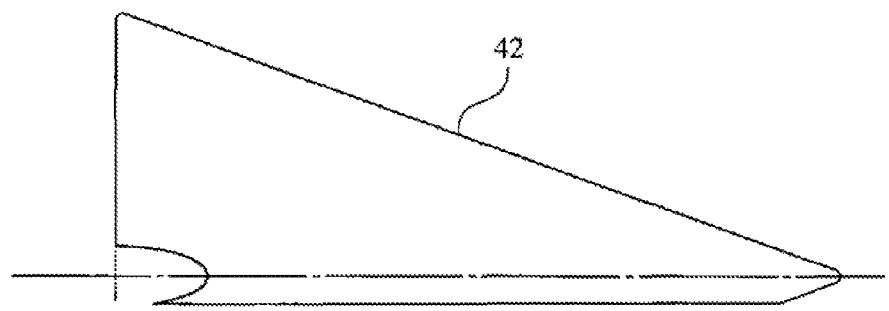
FIG. 18 is a drawing of a half triangularly shaped mixing element according to an embodiment of the invention.
Figure 19:
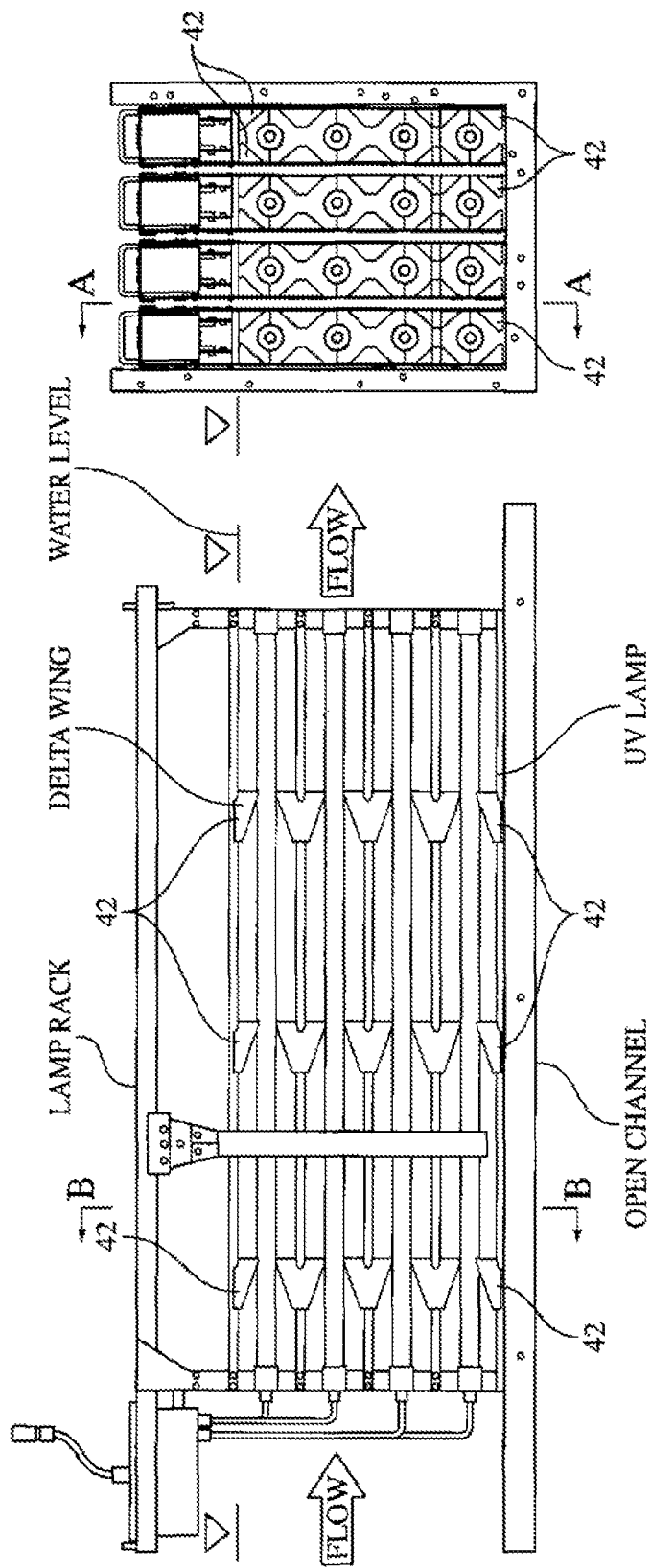
FIGS. 19a and 19b are side and end views showing a lamp rack in an open channel with half triangularly shaped mixing elements at the water level at the top, and at the bottom of the channel according to an embodiment of the invention.

Embodiments of the invention also use half triangularly shaped mixing elements 42 at the top and bottom of the lamp rack. This generates a single full vortex shown in FIG. 17 in the same way that a full triangularly shaped mixing element generates a pair of vortices. As the bottom of the channel is at the mid-point between two lamps, the half triangularly shaped mixing element 42 is moved up approximately 0.7 cm to accommodate the support rod 30. FIG. 18 shows a half triangularly shaped mixing element 42. FIGS. 19a and 19b show a lamp rack in an open channel with half triangularly shaped mixing elements 42 at the water level at the top, and at the bottom of the channel.

Figure 20:
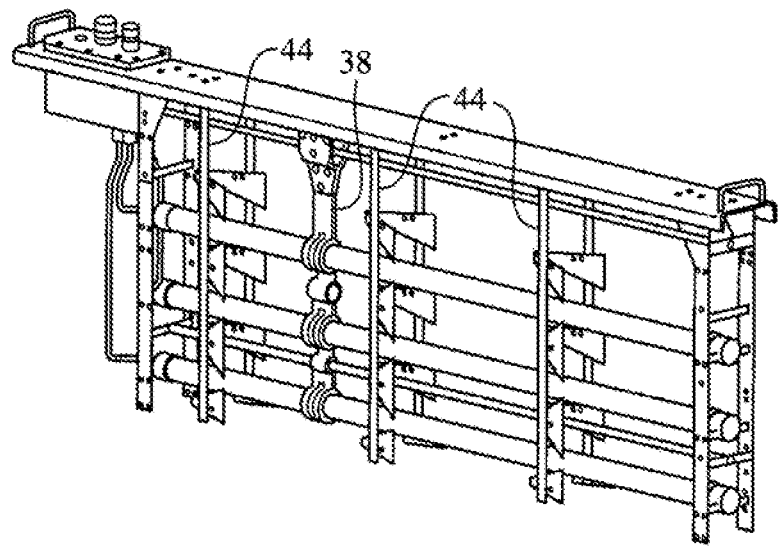
FIG. 20 is an alternate triangularly shaped mixing elements support arrangement with fixed vertical support rods or bars according to an embodiment of the invention.

An alternative arrangement to support the triangularly shaped mixing elements 26 is through the use of vertical support rods or bars 44 as shown in FIG. 20. This has some disadvantages and advantages over the horizontal support arrangement described above. Vertical supports 44 produce more of an impediment to water flow which results in higher head loss through the reactor and also disrupts the vortices to some degree. However in a large lamp rack (e.g. eight lamps stacked vertically), each rod holds seven full triangularly shaped mixing elements and two half triangularly shaped mixing elements. This is in contrast to the three triangularly shaped mixing elements per rod in the horizontal support arrangement. This therefore reduces cost of the system. In addition, using vertical support rods 44 make it possible to remove the triangularly shaped mixing elements (for cleaning for example) without having to remove the whole rack. This is important in dirtier waters where the triangularly shaped mixing elements may have a tendency to accumulate stringers of debris (algae) that is common in secondary wastewater treatment plant effluents.

Figure 21:
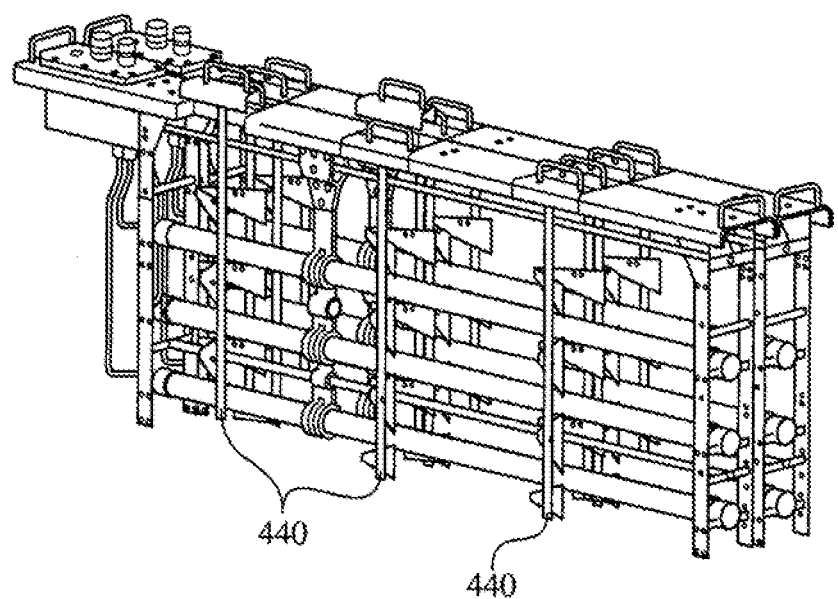
FIG. 21 is an alternate triangularly shaped mixing element support arrangement with removable vertical support rods or bars according to an embodiment of the invention.

An alternate support arrangement with removable vertical support rods or bars 440 is shown in FIG. 21. In addition, it is possible for a single rod to support both of the pairs of triangularly shaped mixing elements between lamp racks in which case a single rod supports fourteen full triangularly shaped mixing elements and four half triangularly shaped mixing elements in the eight lamp rack example cited above, further reducing cost.

Embodiments of the invention include arrangements in closed vessel reactors as shown in FIGS. 22 to 27. A vortex array, similar to that described in the open channel embodiments above, can be generated in a closed vessel UV disinfection system where the lamps are enclosed in a tubular vessel with the flow in the direction of the length of the vessel and the lamps parallel to the flow.

Figure 22:
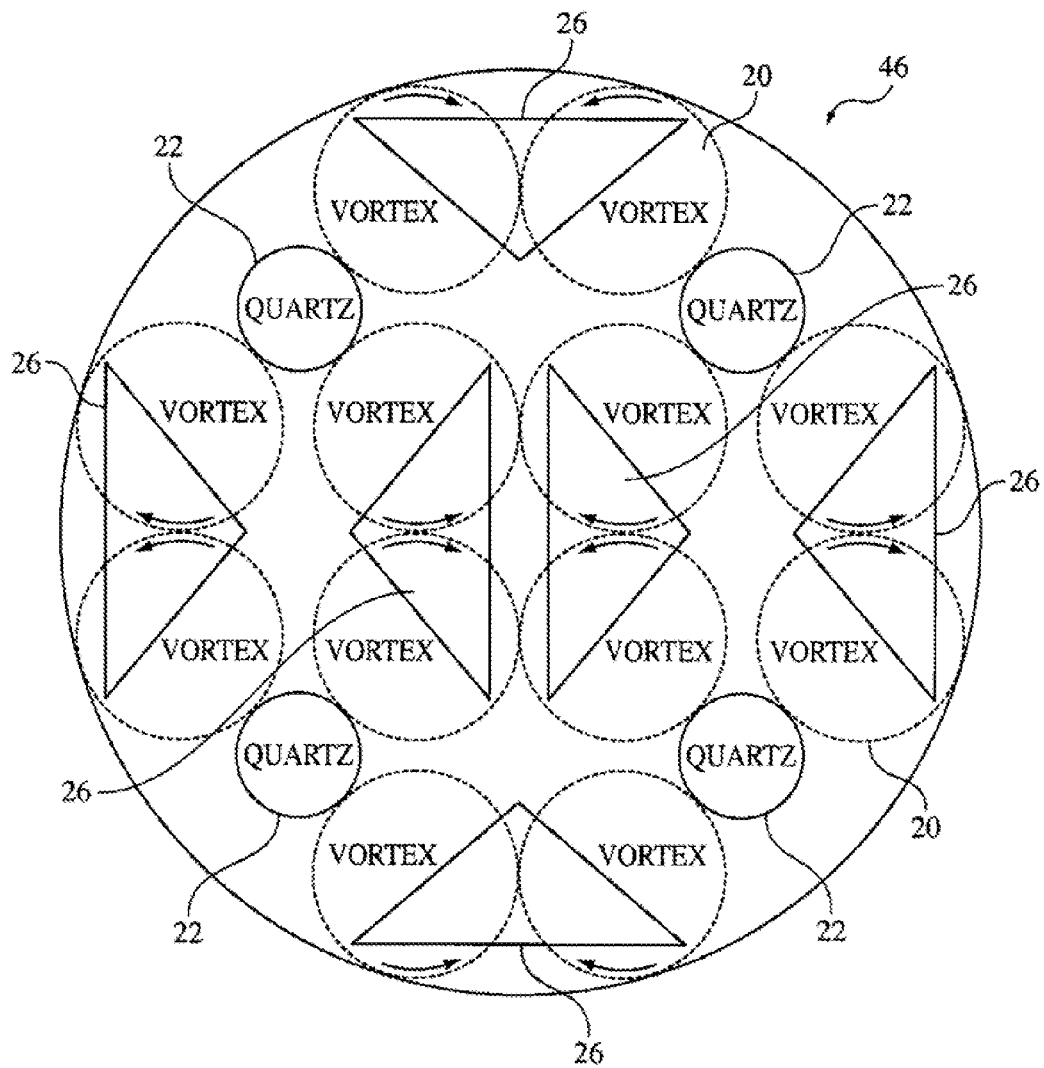
FIG. 22 is a possible arrangement for closed vessel reactor with four lamp array according to an embodiment of the invention.
Figure 23:
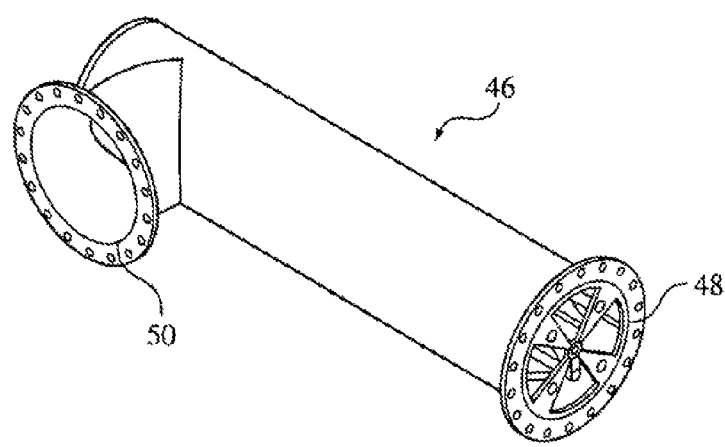
FIG. 23 shows a perspective view of a closed vessel reactor according to an embodiment of the invention.

FIG. 22 shows a four lamp 22 tubular reactor 46. The additional mixing provided by the triangularly shaped mixing elements 26 enable this reactor to be used for water with lower UV transmittance since, as in the open channel arrangement, the vortices 20 generated by the triangularly shaped mixing elements 26 bring water that is furthest from the lamps 22 into close proximity to the lamps 22 and move the water closest to the lamps 22 away from the lamps 22. Such a reactor 46 could have an inlet 48 with water flowing parallel to the lamps and an outlet 50 with the water flowing transverse to the lamps as shown in FIG. 23.

Figure 24:
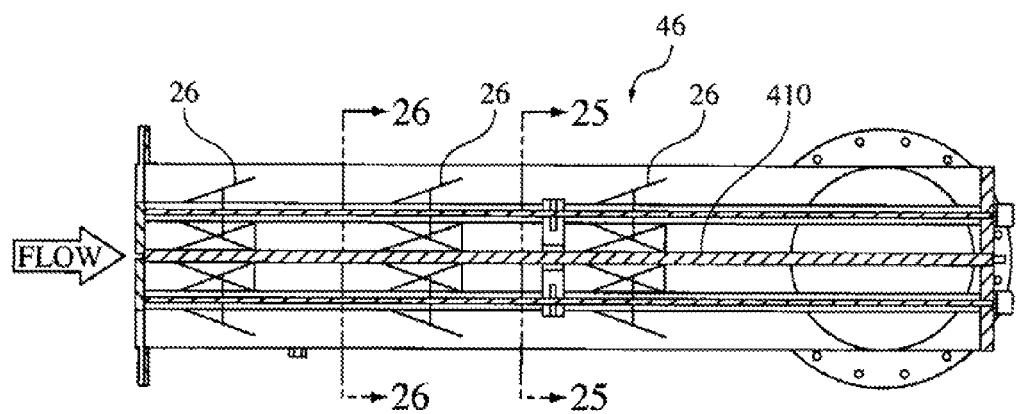
FIG. 24 is a longitudinal cross-sectional view of the closed vessel reactor of FIG. 23.
Figure 25:
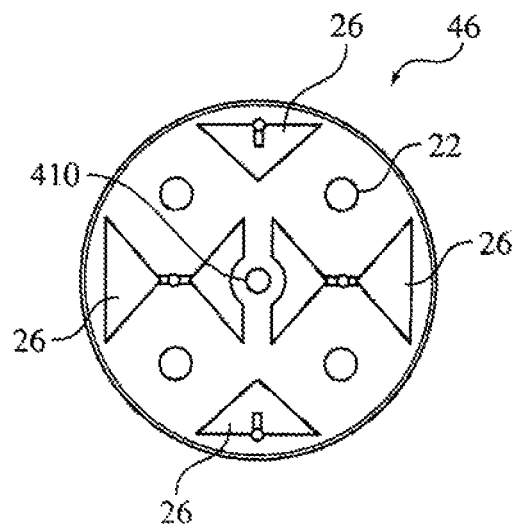
FIG. 25 is a cross-sectional end view of the closed vessel reactor of FIG. 23.
Figure 26:
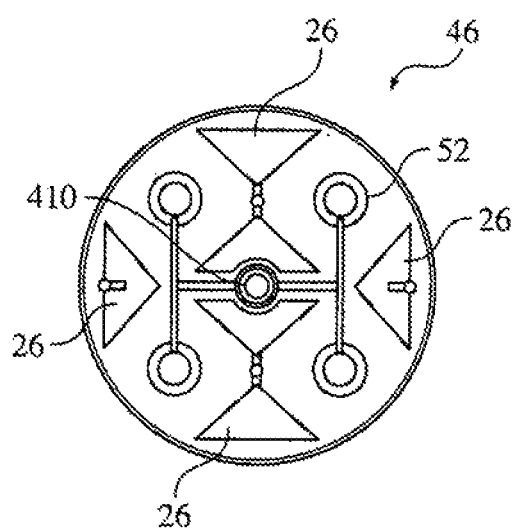
FIG. 26 is a cross-sectional end view of the closed vessel reactor showing a quartz cleaning mechanism according to an embodiment of the invention.

As in the open channel reactor one or more sets of triangularly shaped mixing elements 26 are placed at spaced intervals along the length of the lamps. FIG. 24 shows three sets. A screw drive 410 (FIGS. 24-26) to drive the quartz cleaning elements 52 runs the length of the reactor 46 at the center.

Figure 27:
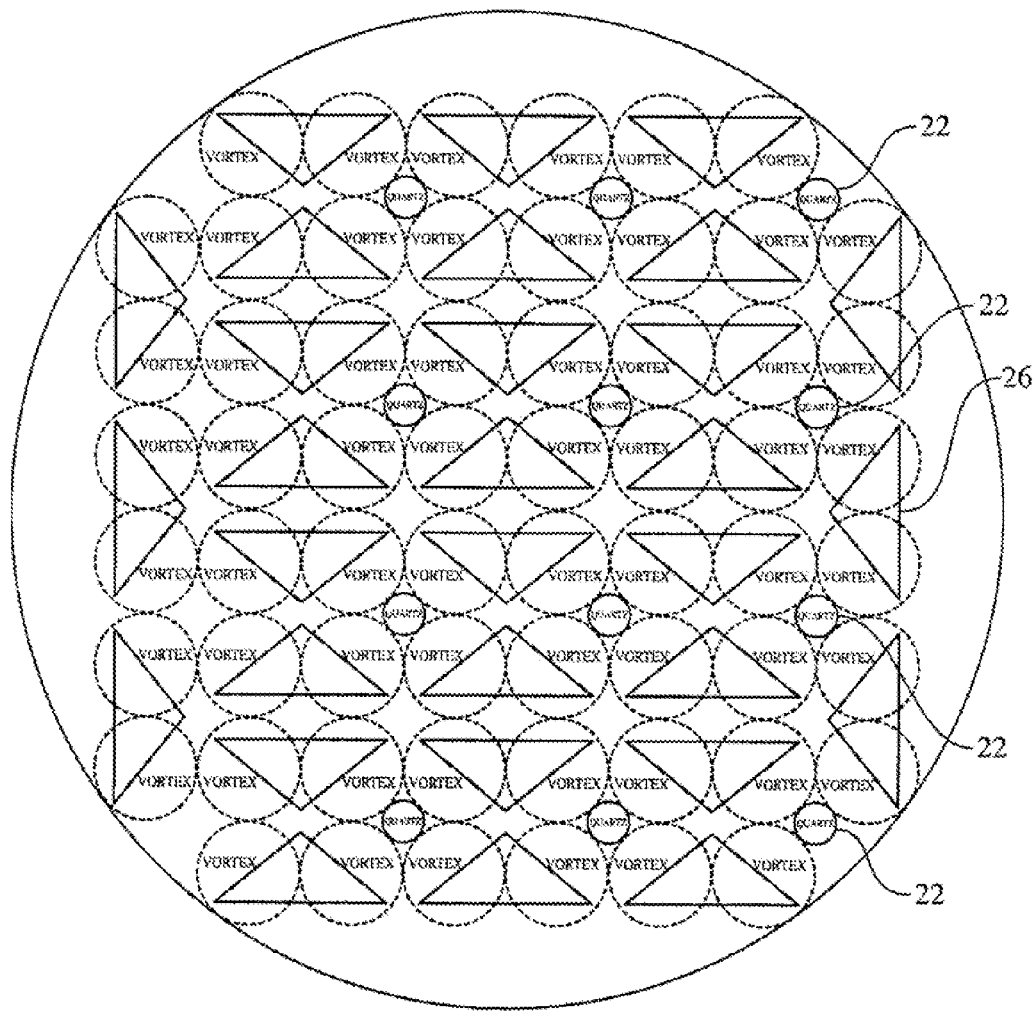
FIG. 27 is an arrangement for closed vessel reactor with sixteen lamp array according to an embodiment of the invention.

FIG. 27 shows a sixteen lamp array with four rows of four lamps 22. In a similar manner, nine, twenty-five or thirty-six lamp arrays could be produced with three rows of three lamps 22, five rows of five lamps 22 or six rows of six lamps 22 respectively. In the larger arrays, some baffles (not illustrated) may be included to prevent water from flowing in the zones near the wall not covered by the vortices.

If not otherwise stated herein, any and all patents, patent publications, articles and other printed publications discussed or mentioned herein are hereby incorporated by reference as if set forth in their entirety herein.

It should be appreciated that the apparatus and methods of the invention may be configured and conducted as appropriate for any context at hand. The embodiments described above are to be considered in all respects only as illustrative and not restrictive.

What is claimed is:

1. An apparatus for mixing at least one fluid flowing through a fluid system, comprising:
    an array of elongated members wherein each elongated member is horizontally aligned with elongated members in adjacent columns and vertically aligned with elongated members in adjacent rows of elongated members, and wherein the axis of each elongated member is substantially aligned with the direction of fluid flow; and
    a plurality of pairs of triangularly shaped mixing elements arranged at spaced intervals along the length of each elongated member, each pair of triangularly shaped mixing element being arranged such that the longest side of each triangularly shaped mixing element is parallel and adjacent to the longest side of the other triangularly shaped mixing element in the pair.

2. The apparatus of claim 1, wherein each elongated member is an ultraviolet light source.

3. The apparatus of claim 1, wherein a portion of the triangularly shaped mixing elements have one apex pointing upstream and at an angle to the direction of flow.

4. The apparatus of claim 1, wherein the mixing elements are mounted on horizontal support rods.

5. The apparatus of claim 1, wherein the mixing elements are mounted on vertical support rods.

6. The apparatus of claim 1, wherein the elongated members are vertically arranged in racks and the mixing elements are mounted on vertical support rods separately removable from the racks.

7. The apparatus of claim 6, wherein each rack includes a frame having spaced apart vertical bars creating an open area around the elongated members.

8. The apparatus of claim 1, wherein a leading apex of one or more triangularly shaped mixing element is removed.

9. The apparatus of claim 1, wherein the fluid system is a closed channel system.

10. A method for mixing at least one fluid flowing through a fluid system:
    submersing an apparatus in the fluid flow, wherein the apparatus comprises:
        an array of elongated members, wherein each elongated member is horizontally aligned with elongated members in adjacent columns and vertically aligned with elongated members in adjacent rows of elongated member, and wherein the axis of each elongated member is aligned with the direction of fluid flow;
        a plurality of pairs of triangularly shaped mixing elements arranged at spaced intervals along the length of each elongated member, each pair of triangularly shaped mixing element being arranged such that the longest side of each triangularly shaped mixing element is parallel and adjacent to the longest side of the other triangularly shaped mixing element in the pair.

11. The method of claim 10, wherein each elongated member is an ultraviolet light source.

12. The method of claim 10, wherein a portion of the triangularly shaped mixing elements have one apex pointing upstream and at an angle to the direction of flow.

13. The method of claim 10, wherein the mixing elements are mounted on horizontal support rods.

14. The method of claim 10, wherein mixing elements are mounted on vertical support rods.

15. The method of claim 10, wherein the elongated members are vertically arranged in racks and the mixing elements are mounted on vertical support rods separately removable from the racks.

16. The method of claim 15, wherein each rack includes a frame having spaced apart vertical bars creating an open area around the elongated members.

17. The method of claim 10, wherein a leading apex of one or more triangularly shaped mixing element is removed.

18. The apparatus of claim 10, wherein the fluid system is a closed channel system.

* * * * *